March 11, 1941.    E. C. HOMAN    2,234,252
SIZED CLOTH BASE AND PRODUCT MADE THEREWITH
Filed Sept. 22, 1939
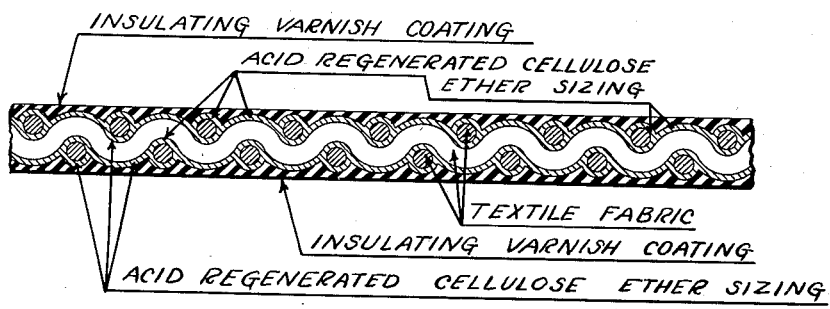
INVENTOR,
EDWARD C. HOMAN,
BY George D. Richards
ATTORNEY.

Patented Mar. 11, 1941

2,234,252

UNITED STATES PATENT OFFICE 2,234,252

SIZED CLOTH BASE AND PRODUCT MADE THEREWITH

Edward C. Homan, East Orange, N. J., assignor to Irvington Varnish & Insulator Co., Irvington, N. J., a corporation of New Jersey Application September 22, 1939, Serial No. 296,066

4 Claims. (Cl. 154—2.6)

This invention relates to the preparation of cloth, such as linen or cotton cambric or other suitable woven textiles, to qualify the same, mainly, for use as a base for insulating varnish or resin coatings in the production of flexible sheet insulation material, or, incidentally, as a strippable or separator base or carrier for sheeted rubber, onto which the rubber may be vulcanized and thereupon quenched with water.

This invention has for an object to provide a sized cloth, the sizing of which is permanent, water proof, and impenetrable by applied overcoatings of insulating varnishes or resins, while at the same time serving to increase the tensile strength, tear resistance and like mechanical or physical properties of the cloth, as well as bettering the electrical properties of the finished insulation material of which it forms the base by assuring the same a lower percentage power factor and an increased resistance to voltage breakdown.

The invention has for a further object to provide, per se, a novel sheet insulation material of the varnished cambric type.

The drawing shows a sheet of insulation in accordance with the invention.

Cloth as heretofore prepared for use as a base for sheet insulation of the varnished cambric type, or, incidentally, as a separator carrier for vulcanized sheet rubber, is first sized with starch; the starch being usually applied to the cloth by means of conventional starching machinery, such as a mangle or quetch, and then dried on tenter frames or over drying cans, and finally calendered so that a smooth surface, having substantially no standing fibers or lint, is obtained. Cloth so starched, when used as a base for applied coatings of insulating varnish or resins in the production of sheet insulation material of the varnished cambric type, has many disadvantages. These disadvantages are, primarily, (1) that the applied starch does not form a continuous film on warp and filler yarns of the cloth, and consequently is readily loosened and shaken out by distortion of the cloth during handling of the same preparatory to and during application thereto of the varnish or resin coatings; (2) the applied starch is highly susceptible to climatic changes, and tends not only to become sticky under humid conditions, but to absorb moisture which is retained after varnishing and which deleteriously effects the desired electrical properties of the varnished cambric or like sheet insulation material of which the starched cloth forms the base; (3) organic solvents and other matter contained in varnish and resin solutions applied to the starched cloth tend to penetrate the starch coating and give rise to poor tear resistance characteristics in the finished sheet insulation material; and (4) the starch offers but poor resistance to free fatty acids present in the oils and varnishes applied to the starched cloth, and consequently these acids tend to attack the cotton or other fibers with weakening effect upon the tensile strength and other mechanical and physical properties of the finished product.

Having in mind the above and other disadvantages of starched cloth, especially when used as a base for sheet insulation material and for other purposes above mentioned, the present invention seeks to provide a sized cloth for said purposes, the sizing of which is of such character that the aforesaid disadvantages of starched cloth are avoided. To this end I have found that if cotton cloth or other suitable textile fabric base is treated with a cellulose which has been chemically altered so as to be soluble in a solution of alkali or in water, one or the other or both, such e. g. as a cellulose ether, and the cloth is then immersed in a dilute acid to coagulate or regenerate the cellulose ether, and then washed free of the acid and thereupon dried and calendered, a continuous sizing coating or film is formed thereon, around and upon the warp and filler yarns composing the same, but without bridging the interstices therebetween which film is highly grease and oil resistant and which is insoluble in varnish or resin solvents, and, consequently, the thus sized cloth is much more suitable than a starched cloth for varnishing or coating with oil or resin solutions in the production of sheet insulation of the varnished cambric type.

Cloth thus sized with a cellulose ether provides an ideal base for sheet insulation material of the varnished cambric type for the following reasons:

(1) The cellulose ether sizing film is continuous, i. e. it forms a continuous coating film around the warp and filler yarns or strands which form the cloth, which does not bridge the interstices of the cloth so as to impair or unduly reduce its flexibility;

(2) The cellulose ether sizing film is insoluble in water;

(3) It is relatively non-hygroscopic, and is therefore insensitive to humidity and does not become tacky under humid climatic conditions;

(4) Organic solvents will not attack or dissolve, or penetrate such cellulose ether sizing film;

(5) Such film resists the penetration of varnish or resin coating applications, causing the same to remain on the surface of the cloth;

(6) Since the cellulose ether sizing is film forming, it adds to the mechanical strength of the yarns and consequently of the cloth to which it is applied;

(7) Since varnish or resin solutions do not penetrate such sizing film, insulating material of lighter color may be obtained when desired;

(8) The cellulose ether sizing film will not disintegrate or dust out as does starch, and consequently cloth sized therewith may be handled faster in the operations of producing sheet insulation material of the varnished cambric type; and (9) The cellulose ether sizing film has, per se, better electrical properties than starch sizing.

The sizing or finishing composition comprises a suitable cellulose ether capable of being coagulated by application thereto of dilute acid. Examples of such cellulose ethers suitable for the sizing or finishing composition are, among others, any of the following:

Alkyl cellulose ethers, e. g. methyl cellulose; ethyl cellulose, propyl cellulose or hydroxy-alkyl cellulose ethers, e. g. hydroxy-ethyl cellulose, hydroxy-propyl cellulose, or hydroxy-butyl cellulose.

If desired, suitable mixtures of alkyl and hydroxy-alkyl cellulose ethers may be used.

The cellulose ethers employed may be of selected solubility, i. e. they may be of a kind soluble in water or soluble in aqueous alkali solutions, one or the other or both; and the same may be produced according to the disclosures of Lillienfeld United States Letters Patent No. 1,722,927 and No. 1,722,928.

In making up the sizing for use, the dispersion medium may be water, or an aqueous solution of an inorganic alkali, such e. g. as sodium potassium hydroxide, or an organic base, such e. g. as the quaternary ammonium hydroxides, in particular the benzyl ammonium hydroxides.

If it should be desired to provide a base fabric of stiffer characteristics than that furnished by a sized unfilled cloth, suitable inorganic fillers may be added to the cellulose ether magma; and, if desired, such fillers may also be selected with respect to their ability to modify the optical effects of the resultant varnished cambric, i. e. to effect lighter color appearance thereof. Examples of employable fillers are, among others, talc, barium sulphate or other mineral fillers.

The following formulae are given as examples of cellulose ether sizes suitable for sizing the cloth base of varnished cambric and like sheet insulation materials, or a cloth base for use as a sheet rubber separator or carrier medium:

*Example I.*—A cellulose ether size which is soluble only in an alkali solution, comprises

| | Parts |
|---|---|
| Hydroxy-ethyl cellulose | 60 |
| Sodium hydroxide | 90 |
| Water | 850 |

*Example Ia.*—A cellulose ether size which is soluble only in an alkali solution, and which is also calculated to produce a cloth filling effect, comprises

| | Parts |
|---|---|
| Hydroxy-ethyl cellulose | 60 |
| Sodium hydroxide | 90 |
| Talc | 240 |
| Water | 850 |

*Example II.*—A cellulose ether size which is soluble in water, comprises

| | Parts |
|---|---|
| Methyl or propyl cellulose | 50 |
| Water | 450 |

*Example IIa.*—A cellulose ether size which is soluble in water, and which is also calculated to produce a cloth filling effect, comprises

| | Parts |
|---|---|
| Propyl cellulose | 50 |
| Talc | 200 |
| Water | 450 |

In using these and other similar sizes the cloth, bleached or gray, is padded through the size by means of suitable applying apparatus, and then is immersed in a bath of dilute acid, such e. g. as 4% sulphuric acid, whereby the cellulose ether is coagulated and regenerated. Thereafter the cloth is washed free of acid and of sodium sulphate, and thereupon dried and calendered, whereby the same is made ready to receive the coating applications of insulating varnish or resin, or to have vulcanized onto the surface thereof sheet rubber to be carried thereby.

When using the cellulose ether sized cloth for production of sheet insulation of the varnished cambric type, any suitable varnish or resin solution is applied thereto by the usual methods and apparatus well known to the industry.

When using the cellulose ether sized cloth as a separator carrier for sheet rubber, the rubber is suitably sheeted over the same and vulcanized onto it, and since the sized cloth is impervious to water, the vulcanized rubber may be quickly and easily quenched by immersion in cold water or by spraying cold water thereover.

I claim:

1. A sheet insulation material comprising a textile fabric base sized by a coagulated cellulose ether deposited as a film on the wrap and filler yarns thereof, and said sized base having a coating of insulating material.

2. A sheet insulation material comprising a woven textile fabric base having thereon a sizing of a dilute acid regenerated cellulose ether deposited as a film around the warp and filler yarns thereof, and bearing a superposed surface coating of insulating varnish.

3. A sheet insulation material comprising a cellulose ether sized textile fabric having an external surface coating of electrical insulating substance selected from the group consisting of varnishes, oils and resins.

4. A sheet insulation material comprising a textile fabric base the strands of which are sized by films of dilute acid regenerated cellulose ether, said sized base having a coating of electrical insulating substance selected from the group consisting of varnishes, oils and resins.

EDWARD C. HOMAN.

CERTIFICATE OF CORRECTION.

Patent No. 2,234,252.                                              March 11, 1941.

EDWARD C. HOMAN.

It is hereby certified that error appears in the printed specification of the above numbered patent requiring correction as follows: Page 2, second column, line 48, claim 1, for the word "wrap" read --warp--; and that the said Letters Patent should be read with this correction therein that the same may conform to the record of the case in the Patent Office.

Signed and sealed this 13th day of May, A. D. 1941.

Henry Van Arsdale, (Seal)                              Acting Commissioner of Patents.